(12) United States Patent
Kleiman et al.

(10) Patent No.: US 7,024,586 B2
(45) Date of Patent: Apr. 4, 2006

(54) USING FILE SYSTEM INFORMATION IN RAID DATA RECONSTRUCTION AND MIGRATION

(75) Inventors: Steven R. Kleiman, Los Altos, CA (US); Stephen H. Strange, Mountain View, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 155 days.

(21) Appl. No.: 10/179,465

(22) Filed: Jun. 24, 2002

(65) Prior Publication Data

US 2003/0237019 A1 Dec. 25, 2003

(51) Int. Cl.
*G06F 11/00* (2006.01)
(52) U.S. Cl. .......................................... 714/7; 714/770
(58) Field of Classification Search .................. 714/5, 714/6, 7, 8, 770
See application file for complete search history.

(56) References Cited

U.S. PATENT DOCUMENTS

| | | | |
|---|---|---|---|
| 4,761,785 A * | 8/1988 | Clark et al. ............ | 714/805 |
| 4,814,971 A | 3/1989 | Thatte | |
| 4,825,354 A | 4/1989 | Agrawal et al. | |
| 5,088,081 A * | 2/1992 | Farr ........................ | 369/47.14 |
| 5,134,619 A | 7/1992 | Henson et al. | |
| 5,144,659 A | 9/1992 | Jones | |
| 5,195,100 A | 3/1993 | Katz et al. | |
| 5,208,813 A | 5/1993 | Stallmo | |
| 5,235,601 A | 8/1993 | Stallmo et al. | |
| 5,276,867 A | 1/1994 | Kenley et al. | |
| 5,278,838 A | 1/1994 | Ng et al. | |
| 5,313,585 A | 5/1994 | Jeffries et al. | |
| 5,313,626 A | 5/1994 | Jones et al. | |
| 5,315,602 A | 5/1994 | Noya et al. | |
| 5,333,305 A | 7/1994 | Neufeld | |
| 5,341,381 A | 8/1994 | Fuller | |
| 5,357,509 A | 10/1994 | Ohizumi | |
| 5,379,417 A | 1/1995 | Lui et al. | |
| 5,390,187 A | 2/1995 | Stallmo | |

(Continued)

FOREIGN PATENT DOCUMENTS

EP 0306244 A2 3/1989

(Continued)

OTHER PUBLICATIONS

Steve Bobrowski. "Protecting Your Date: Overview and Comparison of Backup and Recovery Features in Database Servers", Jul., 1993.

(Continued)

*Primary Examiner*—Scott Badermann
*Assistant Examiner*—Gabriel L. Chu
(74) *Attorney, Agent, or Firm*—Swernofsky Law Group PC

(57) ABSTRACT

On disk failure, the storage system migrates only those disk blocks that included allocated data, and treats unallocated disk blocks as being logically zero when possible. When there is no spare disk, the source data block is logically set to zero and parity is recalculated for the RAID stripe associated with the source data block. When there is a spare, unallocated blocks on the spare are logically or physically set to zero upon migration. Write operations for the failed disk are redirected to other non-failing disks, and a record of which in-use disk blocks have been thus "migrated" to those other non-failing disks in maintained. Unused disk blocks are proactively set to zero. A target mirror copy is created using information regarding allocated disk blocks, by copying those blocks including allocated data or parity, and by clearing at the mirror those blocks not including any allocated data or parity.

60 Claims, 4 Drawing Sheets

U.S. PATENT DOCUMENTS

| | | | |
|---|---|---|---|
| 5,392,244 A * | 2/1995 | Jacobson et al. | 711/114 |
| 5,392,446 A | 2/1995 | Tower et al. | |
| 5,398,253 A | 3/1995 | Gordon | |
| 5,452,444 A | 9/1995 | Solomon et al. | |
| 5,490,248 A | 2/1996 | Dan et al. | |
| 5,502,836 A | 3/1996 | Hale et al. | |
| 5,522,031 A * | 5/1996 | Ellis et al. | 714/6 |
| 5,537,567 A | 7/1996 | Galbraith et al. | |
| 5,550,975 A | 8/1996 | Ichinomiya et al. | |
| 5,566,297 A | 10/1996 | Devarakonda et al. | |
| 5,566,316 A * | 10/1996 | Fechner et al. | 711/114 |
| 5,596,709 A * | 1/1997 | Bond et al. | 714/7 |
| 5,602,987 A * | 2/1997 | Harari et al. | 714/8 |
| 5,657,439 A * | 8/1997 | Jones et al. | 714/7 |
| 5,657,468 A | 8/1997 | Stallmo et al. | |
| 5,675,726 A | 10/1997 | Hohenstein et al. | |
| 5,701,406 A * | 12/1997 | Matsumoto et al. | 714/6 |
| 5,742,752 A | 4/1998 | DeKoning | |
| 5,758,118 A * | 5/1998 | Choy et al. | 711/114 |
| 5,819,292 A | 10/1998 | Hitz et al. | |
| 5,819,310 A | 10/1998 | Vishlitzky et al. | |
| 5,826,001 A * | 10/1998 | Lubbers et al. | 714/6 |
| 5,828,876 A | 10/1998 | Fish et al. | |
| 5,835,953 A | 11/1998 | Ohran | |
| 5,856,981 A | 1/1999 | Voelker | |
| 5,860,090 A * | 1/1999 | Clark | 711/113 |
| 5,862,312 A | 1/1999 | Mann et al. | |
| 5,948,110 A | 9/1999 | Hitz et al. | |
| 5,950,203 A | 9/1999 | Stakuis et al. | |
| 6,006,227 A | 12/1999 | Freeman et al. | |
| 6,038,570 A | 3/2000 | Hitz et al. | |
| 6,052,764 A * | 4/2000 | Mogul | 711/162 |
| 6,101,585 A | 8/2000 | Brown et al. | |
| 6,134,673 A | 10/2000 | Chrabaszcz | |
| 6,138,126 A | 10/2000 | Hitz et al. | |
| 6,282,670 B1 * | 8/2001 | Rezaul Islam et al. | 714/6 |
| 6,317,844 B1 | 11/2001 | Kleiman | |
| 6,327,672 B1 * | 12/2001 | Wilner | 714/6 |
| 6,393,516 B1 * | 5/2002 | Johnson | 711/111 |
| 6,442,649 B1 * | 8/2002 | Anderson | 711/114 |
| 6,598,174 B1 * | 7/2003 | Parks et al. | 714/6 |
| 6,604,172 B1 * | 8/2003 | Katsuragi et al. | 711/114 |
| 6,725,392 B1 * | 4/2004 | Frey et al. | 714/6 |
| 6,728,922 B1 * | 4/2004 | Sundaram et al. | 714/769 |
| 2001/0044807 A1 | 11/2001 | Kleiman et al. | |
| 2002/0007470 A1 | 1/2002 | Kleiman | |
| 2002/0019874 A1 | 2/2002 | Borr | |
| 2002/0019936 A1 | 2/2002 | Hitz et al. | |
| 2002/0049718 A1 | 4/2002 | Kleiman et al. | |
| 2002/0059172 A1 | 5/2002 | Muhlestein | |
| 2002/0059539 A1 | 5/2002 | Anderson | |
| 2002/0071193 A1 * | 6/2002 | Ogawa et al. | 360/31 |
| 2002/0091670 A1 | 7/2002 | Hitz et al. | |

FOREIGN PATENT DOCUMENTS

| | | | |
|---|---|---|---|
| EP | | 0410630 A3 | 1/1991 |
| EP | | 0462917 A2 | 12/1991 |
| EP | | 0462917 A3 | 12/1991 |
| EP | | 0462917 B1 | 12/1991 |
| EP | | 0492808 A2 | 7/1992 |
| EP | | 0492808 A3 | 7/1992 |
| EP | | 0569313 A2 | 11/1993 |
| EP | | 1031928 A2 | 8/2000 |
| EP | | 1031928 A3 | 8/2000 |
| EP | | 1197836 A2 | 4/2002 |
| WO | WO 99/45456 A1 | | 9/1990 |
| WO | WO 91/13404 A1 | | 9/1991 |
| WO | WO 94/29795 A1 | | 12/1994 |
| WO | WO 94/29796 A1 | | 12/1994 |
| WO | WO 94/29807 A1 | | 12/1994 |
| WO | WO 99/46680 A1 | | 9/1999 |
| WO | WO 99/66401 A1 | | 12/1999 |
| WO | WO 00/07104 A1 | | 2/2000 |
| WO | WO 00/11553 A1 | | 3/2000 |
| WO | WO 01/14991 A2 | | 3/2001 |
| WO | WO 01/31446 A1 | | 5/2001 |
| WO | WO 01/43368 A1 | | 6/2001 |
| WO | WO 02/17057 A2 | | 2/2002 |
| WO | WO 02/29572 A2 | | 4/2002 |
| WO | WO 2004/001600 A1 | | 12/2003 |

OTHER PUBLICATIONS

"Migrated Data Backup Utility", Jun., 1994. IBM Technical Disclosure Bulletin, pp. 505-508.

B. Srinivasan and H. Gunasingham. "Recoverable File System for Microprocessor Systems", May, 1985, pp. 179-183. XP 002031805.

David A. Patterson, Garth Gibson, and Randy H. Katz, "A Case for Redundant Arrays of Inexpensive Disks (RAID)", Computer Science Division, Dept. of Electrical Engineering and Computer Sciences. University of California, Berkeley.

Jim Gray, Bob Horst, Mark Walker, "Parity Stripping of Disc Arrays: Low-Cost Reliable Storage with Acceptable Throughput". Tandem Computers Inc., Cupertino, California. Aug. 13, 1990, pp. 148-161.

John H. Hartman, John K. Ousterhout. "The Zebra Striped Network File System". Computer Science Divison Dept. of Electrical Engineering and Computer Sciences. University of California, Berkeley.

"Parity Preservation for Radundant Array of Independent Direct Access Storage Device Data Loss Minimization and Repair", IBM Corp. 1993. vol. 36, No. 03, Mar., 1993. pp. 473-478. XP000354845.

Kay, T. "Configuring RAID." Server+Certification Bible, 2001, ch. 4, Hungry Minds, Inc.

SMARTPAR. "What is SmartPAR?" The Internet Archive, Dec. 2001, http://web.archive.org/web/20011206121054/www.disc-chord.com/smparper/.

* cited by examiner

USING FILE SYSTEM INFORMATION IN RAID DATA RECONSTRUCTION AND MIGRATION

BACKGROUND OF THE INVENTION

1. Field of the Invention

The invention relates to using file system information in RAID data reconstruction and migration.

2. Related Art

One known method of maintaining mass storage in computer systems is called RAID ("Redundant Array of Inexpensive Disks"). RAID storage includes a group of disks, at least portions of which are used to store data and at least portions of which are used to store parity information associated with that data, in which the data and the parity are distributed across multiple disks. This allows a RAID storage system to reconstruct the original data (from the rest of the stored data and from the parity information) in the event that one of the disk blocks (which store data or parity) fails, or in the event that an entire disk fails. Data and parity are associated with each other in sets of disk blocks called RAID stripes.

One known problem with RAID storage is that, in the event a drive fails, the RAID storage system no longer has the same degree of redundancy, and must be adjusted if it is desired to maintain that same degree of redundancy. That is, it is desirable for the RAID storage system to allow a later second disk failure without loss of data, but it will not be possible to reconstruct data for two separate failed disks in a RAID stripe. To maintain the same degree of redundancy, the RAID storage system either has a spare disk onto which to reconstruct the data from the failed disk, or (if there is adequate available space) migrates data from the failed disk to other disks. In the latter case, parity associated with each RAID stripe must be adjusted in response to migration of allocated data. However, reconstruction of data and recalculation of parity involve substantial read and write operations with the disk drives, and it would be advantageous to minimize both the number of accesses to the disks and the amount of information transferred back and forth between the disks and the rest of the computer system.

Accordingly, it would be advantageous to provide a storage system (which might be a RAID storage system or another type of storage system) which maintains data reliability, allows for logical deletion of failed disks, and which minimizes the amount of computation and disk access to perform data migration or reconstruction, or parity adjustment. These advantages and others are provided in an embodiment of the invention, in which information maintained by the file system (including information regarding which disk blocks are actually in use recording stored data) is used in data reconstruction and migration, and recalculation of parity. Advantages of the invention in minimizing computation and disk access can also be used in normal operation of the storage system, as well as in mirroring entire storage volumes from a source to a target storage system.

SUMMARY OF THE INVENTION

The invention provides a method and system which maintains data reliability, allows for logical deletion of failed disks, and which minimizes the amount of computation and disk access to perform data migration or reconstruction, or recalculation of parity. In a preferred embodiment, the storage system uses information regarding essentially only allocated disk blocks when performing data reconstruction and migration, and recalculation of parity and ignores the unallocated disk blocks that have been set to a predetermined value, e.g., zero. On a disk failure, the storage system migrates only those disk blocks on the failed disk that included allocated data, and treats unallocated disk blocks as being logically zero when possible.

In an aspect of the invention, information maintained by a file system identifies which disk blocks are actually allocated on a failed disk. A disk in the RAID group might fail either when there is a spare disk or when there is no spare disk. When data blocks are to be migrated from the failed disk, but there is no spare disk, those data blocks are migrated from the failed disk to other non-failing disks in the RAID group, thus reducing the number of disks in the RAID group. When those data blocks are migrated (that is, the data is reconstructed and copied onto a target data block), the source data block is logically set to zero and parity is recalculated for the RAID stripe associated with the source data block. Once all (or substantially all) allocated data blocks from the failed disk have been migrated, the failed disk can be logically removed from the RAID group. When data blocks are to be migrated from a failed disk to a spare disk, those data blocks are migrated in like manner, except that unallocated blocks on the spare disk are logically or physically set to a selected value (zero) upon migration.

In an aspect of the invention, the file system actively assists the RAID storage system by redirecting write operations (intended for disk blocks on the failed disk) to other non-failing disks. The file system also maintains a record of which in-use disk blocks have been thus "migrated" to those other non-failing disks, thus providing an indicator of when stored data originally maintained on the failed disk has been completely migrated. When writing to disk, the file system proactively sets unused disk blocks to a selected value (zero), to minimize the amount of parity recalculation, both at the time of writing as well as at later times for writing. In a preferred embodiment, the file system sets unused disk blocks to zero at least in the following cases: (1) when a new disk is added to a RAID group, (2) when a RAID stripe that includes unused disk blocks is written to. In a preferred embodiment, the file system maintains a "consistency point" at which stored data is assured self-consistent, and sets unused disk blocks to zero when writing a consistency point to disk.

In an aspect of the invention, the RAID storage system might use a technique (such as RAID level 5), in which parity blocks might be found on different disks. When one of those disks fails, the file system identifies those RAID stripes associated with parity information on the failed disk, and migrates the entire set of data blocks from those stripes to other disks, so as to maintain parity information for those entire stripes on non-failing disks.

In an aspect of the invention, the storage system uses information regarding allocated disk blocks to improve the operations performed by the RAID storage system. The storage system determines when writing any one RAID stripe and in response to which disk blocks are allocated, whether it is more efficient to compute parity by subtraction or by recalculation.

In an aspect of the invention, a target mirror copy of a storage volume can be created using file system information regarding allocated disk blocks, by copying (to the mirror copy) those blocks including allocated data and those blocks including parity, and by clearing (at the mirror copy) those blocks not including any allocated data or parity. The target storage volume can thus be constructed in response to the source storage volume, without requiring any parity recalculation.

The invention has general applicability to file systems and storage systems in which data is maintained on multiple devices, and in which at least some information recorded on those multiple devices can be discarded (for example, is not part of a file system or is a cached object that can be evicted from a cache). None of these applications are limited specifically to file systems that maintain consistency points, nor are they limited specifically to RAID storage systems, nor are they otherwise restricted to systems related to the specific applications disclosed herein.

DETAILED DESCRIPTION OF THE PREFERRED EMBODIMENT

Figure 1:
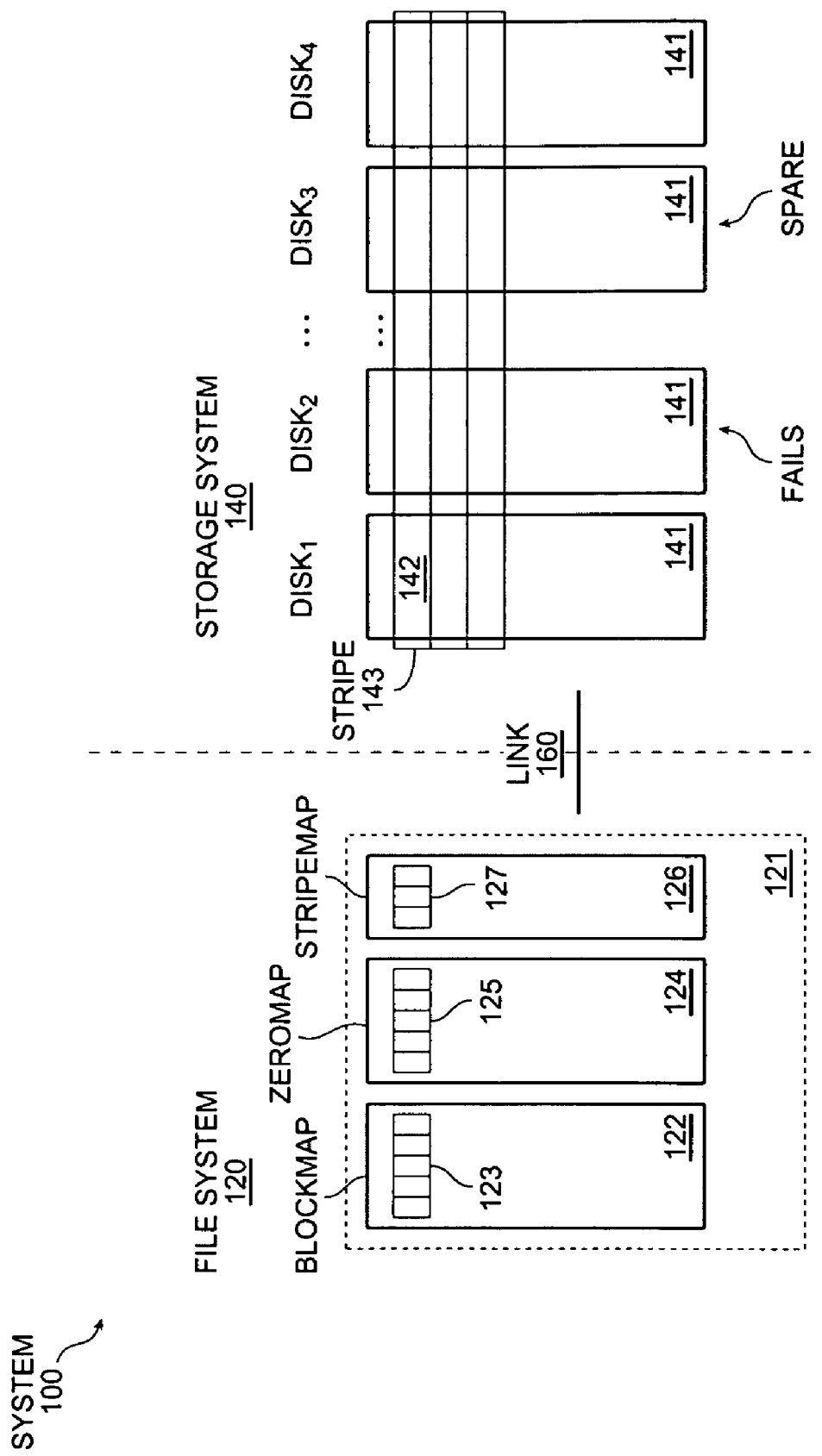
FIG. 1 shows a block diagram of a file system and a RAID storage system, including using file system information in RAID data reconstruction.

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicon

The following terms relate or refer to aspects of the invention or its embodiments. The general meaning of each of these terms is intended to be illustrative and in no way limiting.

consistency point—In general, this refers to an identifiable set of data maintained by a file system that is self-consistent and can therefore be preserved on disk without worry that reference to data within the consistency point will result in file system errors. The phrase "consistency point" is intended to be broad enough to cover file systems that have their self-consistency assured by a set of journal entries for recent changes, as well as those which are atomically self-consistent.

disk block—In general, this refers to an allocable portion of a mass storage system in which data can be stored. The phrase "disk block" is intended to be broad enough to cover allocable space on disks that are either quantized or not.

file system—In general, this refers to any application that manages disk blocks directly on a storage system, including a system that maintains an association between a naming schema and file data maintained on mass storage. The phrase "file system" is intended to be broad enough to cover variants of file systems, including both those systems that read and write directly to/from disk and those systems that allow a different subsystem or other part of an operating system to read or write to disk.

storage system: In general, a system for storing data, for example a set of one or more disks arranged in a RAID array. A storage system can be divided into one or more volumes, each of which acts like a storage system. The terms "storage system" and "volume" or "storage volume" can be used interchangeably.

migration of disk blocks—In general, this refers to any technique for copying or reconstructing data from disk blocks that have been lost onto a different portion of a mass storage system, such as a disk that has not failed and is therefore usable.

parity recalculation—In general, this refers to any technique for recovering parity information or other redundant information after loss, in response to stored data, whether in combination with other redundant information or not.

RAID group—In general, this refers to the set of disks included in a RAID storage system, and used by the RAID storage system to maintain data redundancy. Some systems might include RAID storage systems that separate their disks into more than one RAID group.

RAID storage system—In general, this refers to any technique for maintaining data on a mass storage system that includes a set of redundancy information (such as possibly parity information, a Hamming code, or some other form of redundancy like a copy of the actual data), and that provides the possibility of reconstruction of data in response to loss.

RAID stripe—In general, this refers to any association between data blocks and redundancy information, in which data blocks and redundancy information are interdependent so that at least some can be recovered after loss.

reconstruction—In general, this refers to any technique for recovering data after loss, in response to redundancy information, whether in combination with other stored data or not.

zeromap—In general, this refers to a table having a set of entries indicating which disk blocks have been logically or physically set to zero.

stripemap—In general, this refers to a table having a set of entries indicating which RAID stripes have been migrated from a failed disk.

The scope and spirit of the invention is not limited to any of these definitions, or to specific examples mentioned therein, but is intended to include the most general concepts embodied by these and other terms.

System Elements

FIG. 1 shows a block diagram of a file system and a RAID storage system, including using file system information in RAID data reconstruction.

A system 100 includes a file system 120, a storage system 140, and a communication link 160 between the two.

The file system 120 includes a processor (not shown), program and data memory (not shown), and a set of file system information tables 121 indicating information about disk blocks (whether individually or in groups thereof) in the storage system 140. The file system information tables 121 can be recorded in the memory, or can be recorded on selected portions of the storage system 140, or otherwise (such as in a non-volatile memory or other auxiliary storage device), so long as those file system information tables 121 remain accessible to the file system 120 even in the event of data lost by the storage system 140. Particular information in the file system information tables 121 is further described below.

The storage system 140 includes a set of disks 141, each of which includes a set of disk blocks 142 including data (stored within at least some disk blocks 142), the disk blocks 142 being disposed in a set of RAID stripes 143 including at least some redundant information (stored within at least some disk blocks 142). The RAID stripes 143 are disposed so that information on any individual disk block 142 on any individual disk 141 is associated with information on other disk blocks 142 on other disks 141. This allows information on any individual disk block 142 to be reconstructed or recalculated in the event of loss of any disk block 142 or even an entire disk 141. RAID storage systems are known in the art of mass storage systems.

The communication link 160 couples the file system 120 and the storage system 140, and includes any technique by which the file system 120 and the storage system 140 can exchange information for disk blocks 142 and for operation of the system 100. In a preferred embodiment, the communication link 160 includes a bus coupled to the file system 120 and to the storage system 140.

The file system information tables 121 include a blockmap table 122, having a set of blockmap entries 123, indicating which disk blocks 142 are in use by allocated file system data. Thus, the blockmap table 122 indicates, for each disk block 142 on each disk 141, whether that disk block 142 is in use by the file system 120 (indicated for example by a logical "1" value) or is not in use by the file system 120 (indicated for example by a logical "0" value). As used in this description, "allocated file system data" is distinguished from any temporary data structures that might be maintained by the file system 120, which temporary data structures might possibly include on-disk components. Allocated file system data is also distinguished from backup copies of file system data that might be maintained by the file system 120, such as "snapshot" data as described in disclosures relating to the preferred "WAFL" file system 120.

The file system information tables 121 include a zeromap table 124, having a set of zeromap entries 125, indicating which disk blocks 142 have been logically or physically set to zero.

The file system information tables 121 include a stripemap table 126, having a set of stripemap entries 127, indicating which RAID stripes 143 have been migrated from a failed disk. In an aspect of the invention in which RAID stripes 143 are migrated when those RAID stripes 143 include parity information on a failed disk, each stripemap entry 127 indicates whether the data blocks 142 from that entire RAID stripe 143 have been migrated (because the parity information is not itself migrated).

Migration of Allocated Data

In the event that data in a disk block 142 is lost (for example, the disk block 142 becomes corrupted), or that all the data on a disk 141 is lost (for example, the disk fails), the storage system 140 is capable of reconstructing lost data. However, for any disk block 142 that was lost which is indicated in the blockmap table 122 to not have any allocated data, there is no need to reconstruct data for that disk block 142. Thus, for individual disk blocks 142, if lost but not in use, the storage system 140 does not have to reconstruct any data. For an entire disk 141, if lost, the storage system 140 only has to reconstruct data for those disk blocks 142 which were in use at the time.

In the event there is no spare disk, the file system 120 instructs the storage system 140 to reconstruct data for allocated disk blocks 142 (that is, disk blocks 142 indicated to be allocated by the blockmap table 122), and to copy the reconstructed data to disk blocks 142 on other non-failing disks 141 in the same RAID group in the storage system 140. In alternative embodiments, the reconstructed data may be copied onto other non-failing disks 141 in a different RAID group in the storage system 140. The disk blocks 142 for the failed disk 141 are then no longer written to, so the file system 120 treats them as "holes" in the available VBN (virtual block number) space. For example, if the failed disk is disk #3 out of disks #1, #2, #3, #4, and #5 (parity), the VBNs for disks #1, #2, and #4 will still be valid, but the VBNs for disk #3 will not. When all of the data from the failed disk 141 has been removed, the failed disk 141 is logically or physically removed from the RAID group, thus reducing the number of disks 141 in the RAID group by one.

Those skilled in the art will recognize, after perusal of this application, that use of the blockmap table 122 to reduce the amount of data reconstruction allows the storage system 140 to minimize the amount of work while maintaining the same degree of failure-tolerance. Those skilled in the art will also recognize, after perusal of this application, that this technique could be applied, without undue experimentation or new invention, to RAID and RAID-like systems that already tolerate multiple failures, such as those of Corbett or "EVENODD". More generally, those skilled in the art will also recognize, after perusal of this application, that this technique could be applied, without undue experimentation or new invention, to all storage systems that do not have fixed places where data or metadata must be placed.

When the data for a disk block 142 on a failed disk 141 is migrated, the storage system 140 logically clears (sets to zero) the data for that disk block 142. The file system 120 sets the zeromap entry 125 for the corresponding RAID stripe 143. The storage system 140 recalculates parity for the corresponding RAID stripe 143, and writes the recalculated parity to the parity disk 141 in the corresponding RAID stripe 143.

In the event there is a spare disk, the file system 120 instructs the storage system 140 to migrate the data from allocated disk blocks 142 in like manner. For unallocated disk blocks 142, the storage system 140 writes a corresponding disk block 142 on another non-failing disk 141, but does not attempt to reconstruct data from the unallocated disk blocks 142. Rather, the storage system 140 physically clears (sets to zero) the disk block 142 that is the migration target for an unallocated disk block 142. In a preferred embodiment, the file system 120 instructs the storage system 140 to use the SCSI "write same" command to direct the disk 141 having the disk block 142 that is the migration target; this saves on activity by the disk 141 and on bandwidth between the file system 120 and the storage system 140.

The stripemap table 126 includes one stripemap entry 127 for each RAID stripe 143, indicating for that RAID stripe 143 whether the disk block 142 (from the failed disk 141) in that RAID stripe 143 has been migrated to another non-failing disk 141. When its corresponding stripemap entry 127 indicates that a particular disk block 142 has been migrated from the failing disk 141 to another non-failing disk 141, the storage system 140 is able to remove that particular disk block 142 from consideration during future parity recalculation. More precisely, the storage system 140 recalculates parity on writes to that particular stripe with the presumption that the indicated disk block 142 is uniformly zero. When the stripemap table 126 indicates that all disk blocks 142 from the failed disk 141 have been migrated to other non-failing disks 141, the file system 120 and the storage system 140 can logically delete the failed disk 141 in its entirety.

Redirection of Access Requests

The file system 120 assists the storage system 140 in redirecting requests to access disk blocks 142 on the failed disk 141. In a preferred embodiment, the file system 120 includes a copy-on-write technique in which all write operations to disk blocks 142 (on any disk 141, not just the failed disk 141) are performed by copying the data from the disk block 142 that is the target of the write operation, modifying the copy, and adjusting pointers to the target disk block 142 to point to the newly modified copy. In a preferred embodiment, these modifications are grouped together when generating a consistency point of the storage volume; however, there is no particular requirement for such grouping.

In the event of a disk 141 failure, or a data block 142 becoming corrupted, the file system 120 marks its file system information tables (including a dirty-block table having dirty-block entries) to indicate that each data block 142 that was lost is marked dirty. A first consequence is that any attempt to write the dirty data block 142 will cause a copy-on-write operation to be performed. A second consequence is that the file system 120 will generate a copy of the data block 142 as part of writing a consistency point to disk, no later than the next consistency point.

Since user requests for the lost data block 142 are redirected, and since the file system 120 will generate a copy of the data block 142 no later than the next consistency point, the storage system 140 can await instructions from the file system 120 and need not respond by aggressively reconstructing lost data blocks 142.

Proactive Zeroing of Disk Blocks

In certain cases, the file system 120 proactively instructs the storage system 140 to set an entire disk block 142 to zero, thus allowing easy recalculation (or no recalculation) of the parity information associated with the stripe containing that disk block 142. In a preferred embodiment, the file system 120 instructs the storage system 140 to use the SCSI "write same" command, as described above.

The file system 120 sets entire disk blocks to zero in at least the following cases:

When a new disk 141 is added to a RAID group, each RAID stripe 143 is thus widened by one disk block 142, and parity for each such stripe thus is responsive to data in the new disk block 142. Rather than recalculate any of the parity information, the file system 120 proactively instructs the storage system 140 to set all of the disk blocks 142 in the new disk 141 to zero, thus causing the parity information to be unchanged.

Parity is preferably calculated as the sum modulo 2, also known as the exclusive-or ("XOR"), of all data in the disk blocks 142 in the RAID stripe 143. Therefore, inserting a new disk block 142 that is all zero does not change parity in the RAID stripe 143.

When a RAID stripe that includes unallocated disk blocks 142 (that is, disk blocks 142 not marked "in use" by the file system 120) is written to, the file system 120 proactively instructs the storage system 140 to set the data in those disk blocks to zero. This allows either the file system 120 or the storage system 140, or some other component of the system 100 such as a fly-by XOR subsystem, depending on implementation, to recalculate the parity information for that stripe without having to read the unused disk block 142. Not having to read unused disk blocks 142 reduces the number of read operations performed by the storage system 140, and reduces the amount of communication bandwidth used between the file system 120 and the storage system 140.

When the file system 120 is ready to write a consistency point to disk, it generally writes a relatively large number of disk blocks 142 on the disk 141. The file system 120 attempts to group those disk blocks 142 into entire RAID stripes 143, so that write operations can be as efficient as possible, and so that parity calculation can be minimized (viewed as an overhead operation per disk block 142 of allocated data). When writing to a RAID stripe 143, the file system 120 instructs the storage system 140 to clear those disk blocks 142 in the RAID stripe that are not part of the consistency point (and are therefore going to be marked unallocated by the file system 120). This allows parity calculation to proceed without having to read those disk blocks 142.

Efficient Calculation of Parity

In an aspect of the invention, operations performed by the RAID storage system are responsive to zeromap table 125 for disk blocks 142 in a target RAID stripe 143. In response to those zeromap table 125, the file system 120 can count the number of nonzero data blocks in the target RAID stripe 143; this allows the file system 120 or the storage system 140 to determine, when writing any individual RAID stripe 143, whether it is more efficient to compute parity by subtraction or to compute parity by recalculation.

The storage system 140 can compute parity by subtraction, that is, when writing a disk block 142 to disk 141, the storage system 140 can subtract the old data in the disk block 142 from the associated parity (for that RAID stripe 143) and add the new data to be written to the disk block 142 to the associated parity. Both the subtraction and the addition are performed bitwise modulo two. Computing parity by subtraction is known in the art of RAID storage systems. Alternatively, the storage system 140 can recalculate the parity information by adding (modulo two) all of the disk blocks 142 for that RAID stripe 143.

When writing a set of disk blocks 142 to the disk 141, the file system 120 determines whether computing parity by subtraction would require fewer disk operations, or whether recalculating parity from the entire RAID stripe 143 would require fewer disk operations. The file system 120 can determine this from the zeromap table 124; it can determine if enough disk blocks in the RAID stripe are zero and can therefore be left out of calculating parity information entirely. The RAID system can also simply zero unallocated blocks in the stripe 143 if they have not been prezeroed (as indicated by the zero map). This is particularly useful for non-WAFL file systems where it is more likely that there are unallocated blocks in a stripe.

Migrating on Loss of Parity

In a RAID level 4 system, parity is maintained on a single disk 141 in the storage system 140; that is, all RAID stripes have their parity on the same disk 141, which might therefore be referred to as the "parity disk". In a RAID level 5 system, parity is distributed across the multiple disks 141 in the storage system 140; that is, each RAID stripe might have its parity on a different disk 141, so there is no single "parity disk".

If one disk 141 in a RAID level 5 system fails, those RAID stripes that were using the failed disk 141 for their parity no longer have a parity block, and are therefore subject to losing information if one or more of their remaining disk blocks 142 loses data. The file system 120 marks the disk blocks 142 for those RAID stripes "dirty," so that the next time a consistency point is written to disk, those disk blocks 142 are written to different locations on the same or on other disks, in RAID stripes 143 having a valid parity block. As a result, disk blocks 142 in RAID stripes 143 whose parity has been lost are written to data blocks 142 in other RAID stripes 143 (not necessarily all to the same RAID stripes 143) that have an available parity block.

Method of Operation

Figure 2:
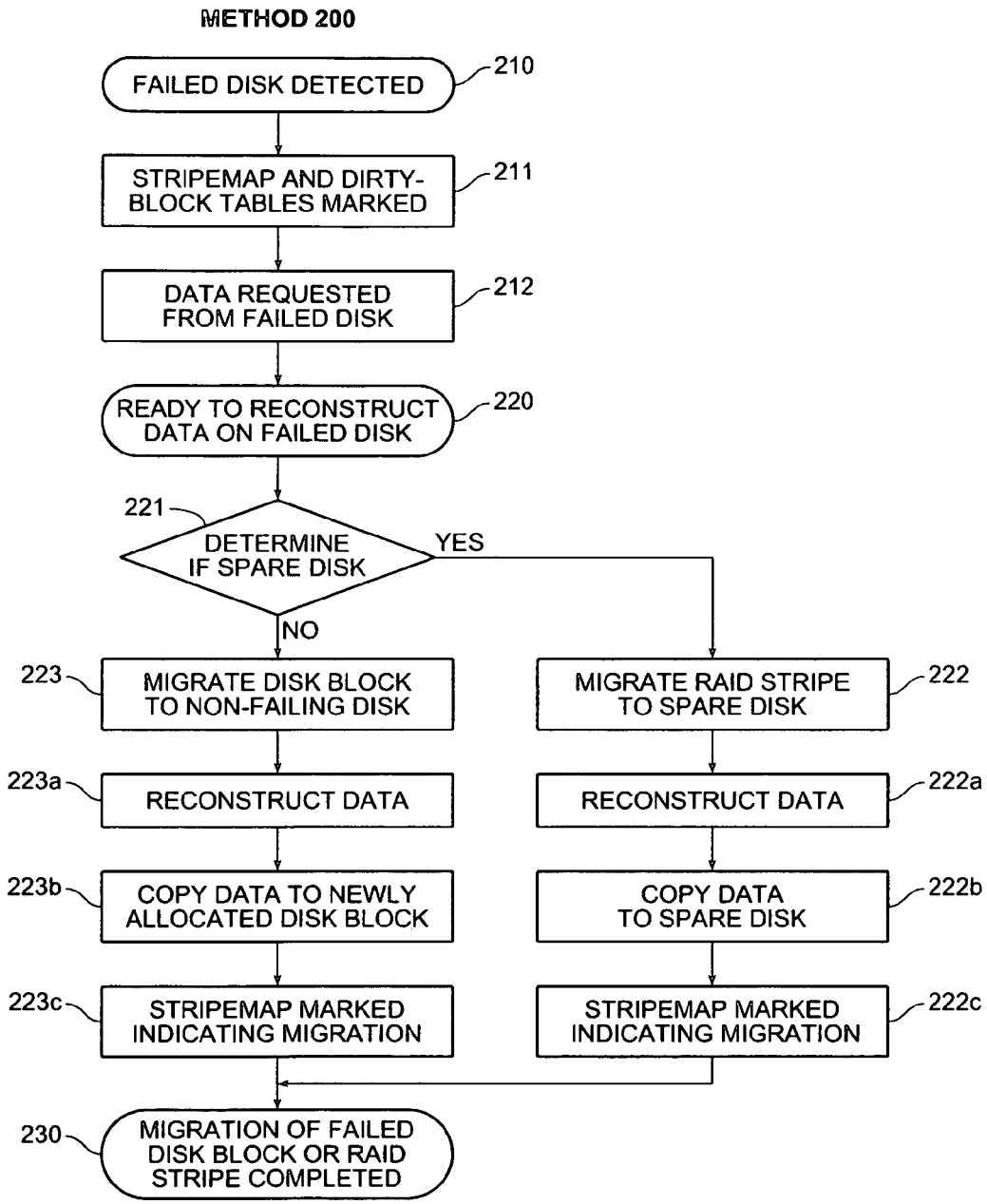
FIG. 2 shows a process flow diagram of a method including using file system information in RAID data reconstruction.

FIG. 2 shows a process flow diagram of a method including using file system information in RAID data reconstruction.

A method 200 is performed by the system 100. Although the method 200 is described serially, the flow points and steps of the method 200 can be performed by separate elements in conjunction or in parallel, whether asynchronously or synchronously, in a pipelined manner, or otherwise. There is no particular requirement that the method 200 must be performed in the same order in which this description lists flow points or steps, except where explicitly so indicated.

Migration of Allocated Data

At a flow point 210, the system 100 has detected a failed disk 141.

At a step 211, the file system 120 marks the stripemap table 126 to indicate that no disk blocks 142 from any RAID stripes 143 have been migrated yet from the failed disk 141. The file system 120 also marks the dirty-block table to indicate that all disk blocks 142 on the failed disk 141 will be treated as dirty blocks. In the method 200, a first RAID stripe 143 refers to a RAID stripe on the failed disk 141. A second RAID stripe 143 refers to a RAID stripe on a spare or other non-failing disk.

At a step 212, the file system 120 receives a user request to access one of the data blocks 142 on the failed disk 141. Since user requests are only applicable to allocated data, including either file data or metadata, the method 200 proceeds at the flow point 220 to reconstruct data from the data block 142.

At a flow point 220, the method 200 is ready to reconstruct data from a data block 142 on the failed disk 141.

At a step 221, the storage system 140 determines if there is a spare disk 141. If so, the method 200 proceeds with the step 222. If not, the method 200 proceeds with the step 223.

At a step 222, (there is a spare disk 141) the storage system 140 migrates the first RAID stripe 143 associated with the disk block 142 to the spare disk 141, and the method 200 proceeds with the flow point 230. To perform this step, the storage system 140 performs the following sub-steps:

At a sub-step 222a, the storage system 140 reconstructs data from the disk block 142. The storage system 140 uses the other data blocks 142, and the parity block, from the first RAID stripe 143. However, the storage system 140 can ignore those data blocks 142 in the first RAID stripe 143 for which the associated zeromap entry 125 indicates that the data block 142 is uniformly zero.

At a sub-step 222b, the storage system 140 copies data from the RAID stripe 143 to a second target RAID stripe 143 on the spare disk 141. However, the storage system 140 does not copy those data blocks 142 which are unallocated, using their associated blockmap entries 123 to determine which ones. The storage system 140 proactively clears the data blocks 142 for those unallocated blockmap entries 123 in the second target RAID stripe 143, using the SCSI "write same" command. The storage system 140 recalculates parity in response to its proactive clearing of those data blocks 142.

At a sub-step 222c, the file system 120 marks the corresponding stripemap entry 127 to indicate that the first RAID stripe 143 was entirely migrated to the spare disk 141.

At a step 223, (no spare disk 141) the storage system 140 migrates the data block 142 from the failed disk 141 to another non-failing disk 141, and the method 200 proceeds with the flow point 230. To perform this step, the storage system 140 performs the following sub-steps:

At a sub-step 223a, the storage system 140 reconstructs data from the disk block 142. The storage system 140 uses the other data blocks 142, and the parity block, from the first RAID stripe 143. However, the storage system 140 can ignore those data blocks 142 in the first RAID stripe 143 for which the associated zeromap entry 125 indicates that the data block 142 is uniformly zero.

At a sub-step 223b, the storage system 140 copies data into the newly allocated data block 142. The storage system 140 recalculates parity for the original first RAID stripe 143, presuming that the failed disk block 142 is now logically zero.

At a sub-step 223c, the file system 120 marks the corresponding stripemap entry 127 for the first RAID stripe 143 associated with the data block 142 to indicate that the data block 142 was migrated to a non-failing disk 141. The file system 120 marks the corresponding zeromap entry 125 for the failed disk block 142 to indicate that the disk block 142 is now logically zero.

At a flow point 230, migration of a failed disk block 142 or an entire first RAID stripe 143 has been completed. The system 100 repeats migration until all allocated disk blocks 142 from the failed disk 141 have been migrated, either to a spare disk 141 or to other non-failing disks 141.

Mirroring Without Recalculating Parity

Figure 3:
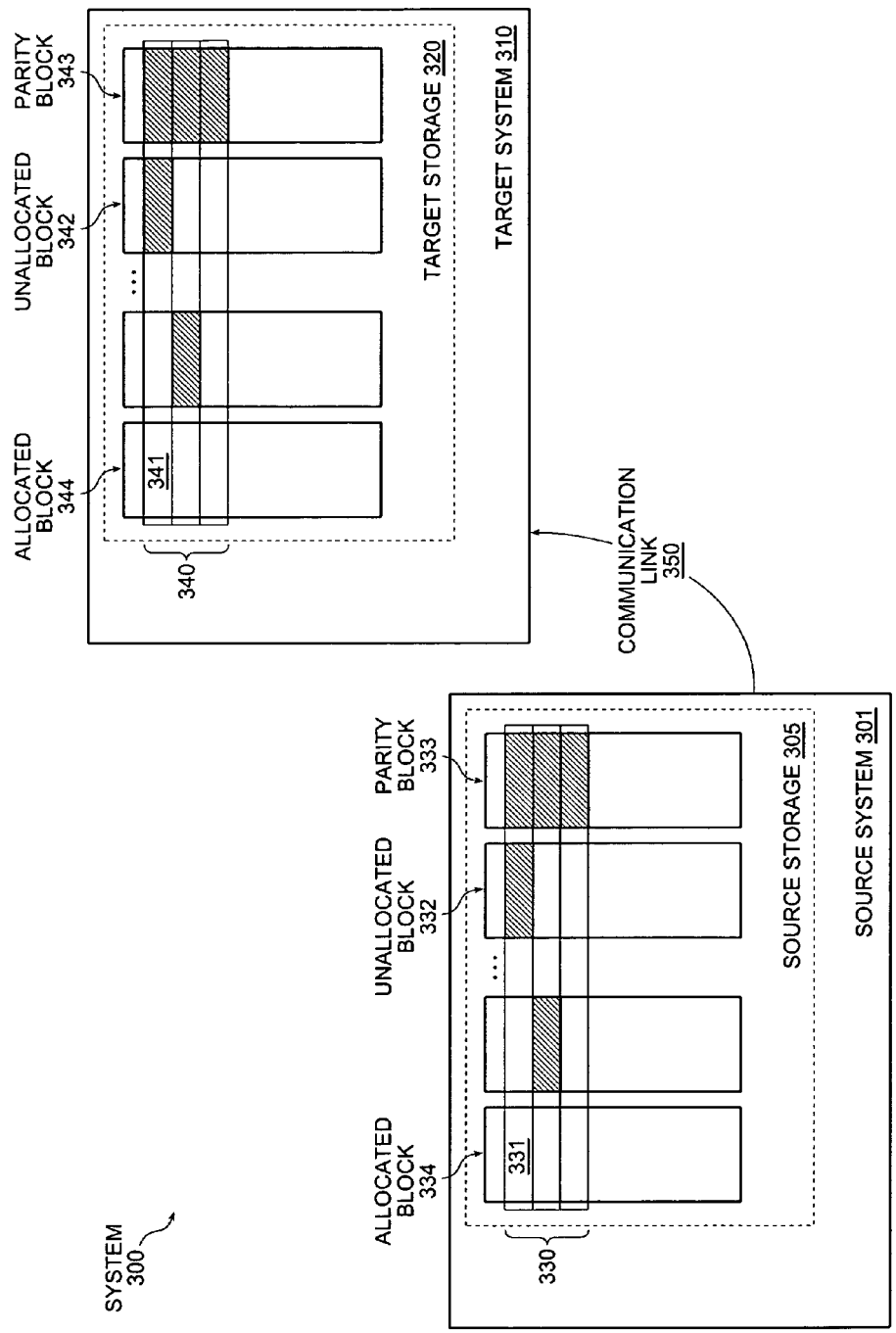
FIG. 3 shows a block diagram of a system capable of mirroring without recalculating parity.

FIG. 3 shows a block diagram of a system capable of mirroring without recalculating parity.

As described above, when re-establishing (or initially establishing) a mirror copy of a storage volume, the target storage volume (also called the mirror storage volume) can use the computed parity from the source storage volume, by assuring that unallocated blocks on the target storage volume are set to zero when stripes including those unallocated blocks are written.

A system 300 capable of mirroring without recomputing parity includes a source system 301 including a source storage system 305, similar to the system 301 and storage system 305 described with reference to FIG. 1, and a target (or mirror) system 310 including a target storage system 320, also similar to the system 301 and storage system 305 described with reference to FIG. 1. The source storage system 305 includes a set of source RAID stripes 330 including disk blocks 331; the target storage system 320 similarly includes a set of target RAID stripes 340 including disk blocks 341. The target RAID stripes 340 are similar to, and preferably logically identical to, the source RAID stripes 330.

The source system 301 and the target system 310 are coupled using a communication link 350. In a preferred embodiment, the communication link 350 includes a fibre channel or a SAN (storage area network). In other embodiments, the communication link 350 can include a LAN (local area network), WAN (wide area network), or some combination thereof, such as an Internet connection. Those skilled in the art will recognize that the communication link 350 might include any technique for sending data from the source system 301 to the target system 310, and is not limited in any way to specific embodiments described herein.

The source RAID stripes 330 include a set of allocated blocks 331, at least one unallocated block 332, and a set of parity blocks 333.

When reestablishing (or initially establishing) a mirror relationship between the source storage system 305 and the target storage system 320, the source system 301 selects a set of allocated blocks 334 from the source RAID stripes 330 to send to the target system 310. In a preferred embodiment, these allocated blocks 334 are derived from file system information at the source system 301 and include only those data blocks indicated by a file system at the source system 301 to be allocated.

The source system 301 sends the selected allocated blocks 334, together with the parity blocks 333 associated with their RAID stripes 330, to the target system 310. Furthermore, the source system 301 zeros any unallocated blocks 332 that have not been already prezeroed. The target system 310 receives the data from these allocated blocks 334 and stores them in its target RAID stripes 340 at corresponding locations for allocated blocks 344. Similarly, the target system 310 receives the associated parity blocks 333 and stores them in its target RAID stripes 340 at corresponding locations for parity blocks 343.

Because the target system 310 has target RAID stripes 340 that are logically identical to the source RAID stripes 330, the target system 310 can determine that all its own unallocated blocks 342 are unallocated at the source storage system 305. The target storage system 320 can therefore set all those unallocated blocks 342 to zero values, using the SCSI "write same" command.

As a result, the target storage system 320 will be substantially identical to the source storage system 305 after the data blocks are sent, received, and stored; hence, the mirror relationship between the source storage system 305 and the target storage system 320 is reestablished.

Method of Mirroring

Figure 4:
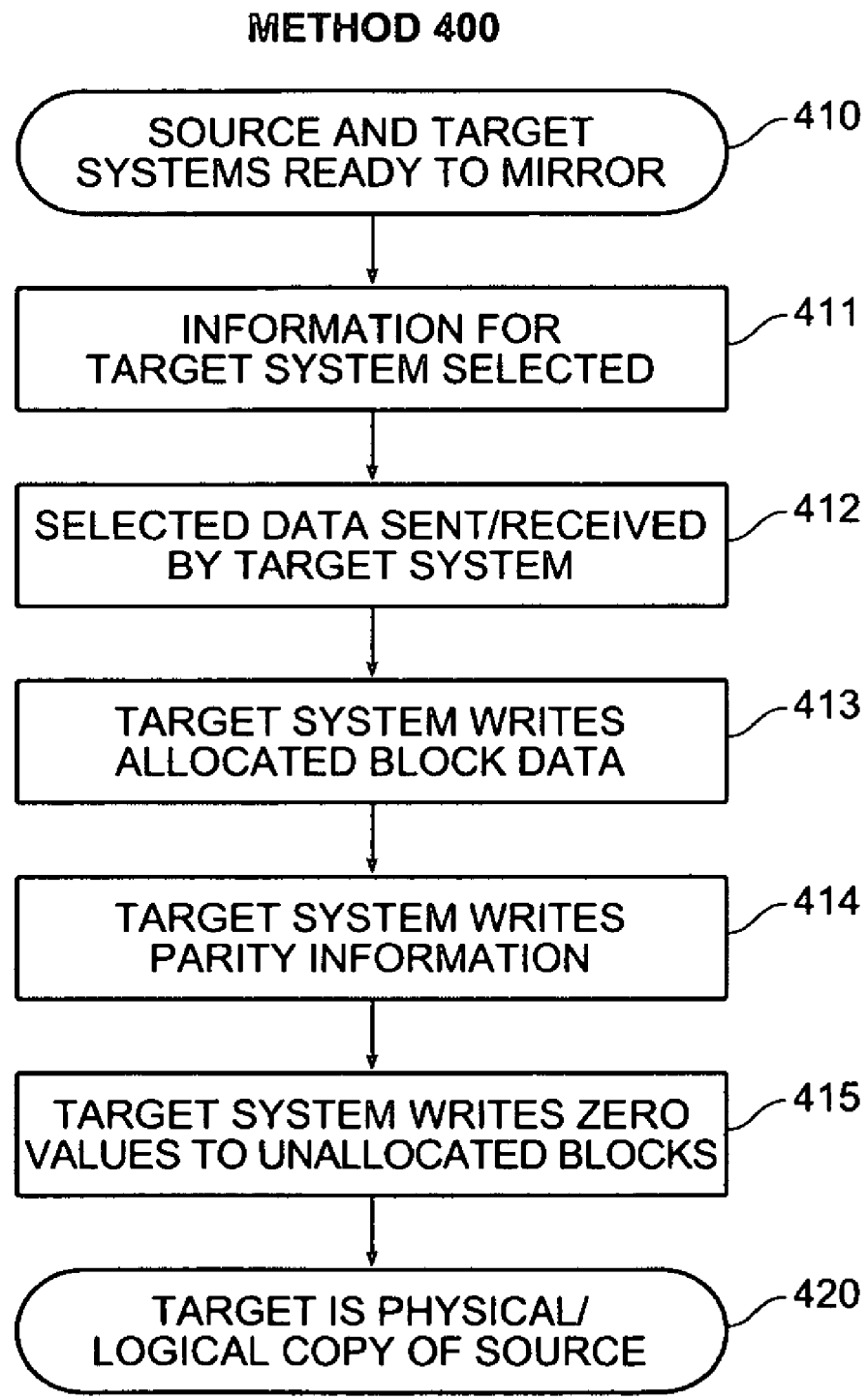
FIG. 4 shows a process flow diagram of a method of mirroring without recalculating parity.

FIG. 4 shows a process flow diagram of a method of mirroring without recalculating parity.

A method 400 is performed by a source system 301 and a target (mirror) system. The source system includes a source storage system 305 and a source file system (not shown) similar to file system 120. The target system is similar to target system 310. Similar to the method 200, although the method 400 is described serially, the flow points and steps of the method 400 can be performed by separate elements in conjunction or in parallel, whether asynchronously or synchronously, in a pipelined manner, or otherwise. Also similar to the method 200, there is no particular requirement that the method At a flow point 410, the source system 100 and the target system are ready to reestablish a mirror relationship. In a preferred embodiment, the source system 100 and the target system have communicated so as to each arrive at a state in which the mirror relationship is about to be reestablished. Moreover, in a preferred embodiment, the source system 100 and the target system have determined a minimal set of data blocks to be sent from the source system 100 to the target system to achieve a reestablishment of the mirror. In an embodiment, substantially a minimum number of data blocks not already present at the target system are selected for sending from the source system 100. One method for determining a minimal set of data blocks is shown in the following document(s):

U.S. patent application Ser. No. 09/684,487 (Express Mail Mailing No. EL 524780596 US), filed Oct. 4, 2000, in the name of Steven R. KLEIMAN and Srinivasan VISWANATHAN, titled "Recovery of File System Data in File Servers Mirrored File System Volumes", (Network Appliance docket PO1-1031.01).

This document is hereby incorporated by reference as if fully set forth herein.

At a step 411, the source system 120 selects a set of information to be sent to the target system. As described above, only allocated data blocks need be sent. At this step, the selected information to be sent includes (a) striping information, and (b) parity information. Striping information describes how the data blocks that are sent are organized in RAID stripes. Parity information includes the computed parity for those RAID stripes. For information regarding which blocks in the defined RAID stripes are unallocated blocks, either the source system 120 sends that information explicitly, or the target system determines that information in response to the striping information and the identification of those data blocks it receives.

At a step 412, the source system 120 sends (and the target system receives) allocated data blocks, the striping information described in the step 411, and the parity information described in the step 411. At this step, the source system 120 can also zero unallocated blocks in the RAID stripe that have not already been prezeroed.

At a step 413, the target system writes data from the allocated data blocks into their appointed places on the designated disk drives and designated RAID stripes of its storage volume.

At a step 414, the target system writes data from the parity information into the designated RAID stripes of its storage volume.

At a step 415, the target system writes zero values to unallocated blocks in the designated RAID stripes of its storage volume. In a preferred embodiment, the target system uses the SCSI "write same" command to write copies of the same data bytes (that is, zero) to every location in each unallocated block; as described above, this is quicker than writing an actual disk block of zero values, and takes less communication bandwidth between the file system and the storage volume.

Because the unallocated blocks at the source system 120 are zero, either logically zero or physically zero, the parity information the source system 120 sends to the target system is correct when those unallocated blocks are presumed to be zero. The target system can therefore safely set those unallocated blocks to actually be zero, while using the same parity information without recomputing that parity.

At a flow point 420, the target system is a physical and logical copy of the source system 120. Any bookkeeping operations between the source system 120 and the target system are completed, and the mirror relationship between the two is reestablished.

The method 400 can be performed any time when reestablishing, or initially establishing, a mirror relationship between a source storage volume and a target storage volume, so long as equivalent RAID stripes are used at both the source storage volume and the target storage volume.

GENERALITY OF THE INVENTION

The invention has general applicability to file systems and storage systems in which data is maintained on multiple devices, and in which at least some information recorded on those multiple devices can be discarded (for example, is not part of a file system or is a cached object that can be evicted from a cache). None of these applications are limited specifically to file systems that maintain consistency points, nor are they limited specifically to RAID storage systems, nor are they necessarily related to the specific applications disclosed herein.

Other and further applications of the invention in its most general form would be clear to those skilled in the art after perusal of this application. The invention would be usable for such other and further applications without undue experimentation or further invention. Although preferred embodiments are disclosed herein, many variations are possible which remain within the concept, scope and spirit of the invention; these variations would be clear to those skilled in the art after perusal of this application.

The invention applies to any storage system in which data and metadata are not assigned fixed locations on mass storage; this could include a file server, a database or network cache, or another type of storage device. Although in a preferred embodiment, the invention is primarily used for file servers using RAID storage systems, there is no specific requirement to limit the applicability of the invention thereto.

The invention applies to any system in which data can be reconstructed from redundant information; this could include any type of storage system, or even a communication system using at least some redundant information. Although in a preferred embodiment, the invention is primarily used for storage systems using multiple disk drives and parity, there is no specific requirement to limit the applicability of the invention thereto.

Those skilled in the art will recognize, after perusal of this application, that these alternative embodiments are illustrative and in no way limiting.

What is claimed is:

1. A method including
identifying a first group of data blocks, said first group including a block capable of maintaining redundant information associated with said data blocks;
determining if there is a failed data block in said first group;
in response to a result of said determining operation, reconstructing data from said failed data block and determining whether to send said data to a data block associated with a second group, said second group having at least one non-failed data block;
maintaining information about a set of failed data blocks on a first disk, said information including a stripemap with entries indicating which groups of data blocks have been migrated to one or more second disks; and
logically setting said failed data block in said first group to a selected value, whereby later calculation of said redundant information for said first group can proceed without reconstructing said data.

2. A method as in claim 1, including
in response to information about said failed data block, determining whether to refrain from sending data from said failed data block to said second group, and instead set a target data block in said second group to said selected value.

3. A method as in claim 1, including
logically removing said first disk from a storage system when substantially all said failed data blocks have been migrated to said one or more second disks.

4. A method as in claim 1, including
identifying attempts to access said failed data block;
in response to said attempts to access, performing said reconstructing operation to a target data block; and
redirecting said attempts to access to said target data block.

5. A method as in claim 4, including
marking said failed data block with an indicator that attempts to access said failed data block should be redirected; and
performing said redirecting operation in response to said indicator.

6. Apparatus including
means for identifying a first group of data blocks, said first group including a block capable of maintaining redundant information associated with said data blocks;
means for determining if there is a failed data block in said first group;
means for reconstructing data from said failed data block in response to a result of said determining operation;
means for sending said data to a data block associated with a second group, said second group having at least one non-failed data block;
means for maintaining information about a set of failed data blocks on a first disk, said information including a stripemap with entries indicating which groups of data blocks have been migrated to one or more second disks; and
means for logically setting said failed data block to a selected value, whereby later calculation of said redundant information for said first group can proceed without reconstructing said data.

7. Apparatus as in claim 6, including
means for, in response to information about said failed data block, determining whether to refrain from sending data from said failed data block to said second group, and instead setting a target data block in said second group to said selected value.

8. Apparatus as in claim 6, including
means for logically removing said first disk from a storage system when substantially all said failed data blocks have been migrated to said one or more second disks.

9. Apparatus as in claim 6, including
means for identifying attempts to access said failed data block;
in response to said attempts to access, means for performing said reconstructing operation to a target data block; and
means for redirecting said attempts to access to said target data block.

10. Apparatus as in claim 9, including
means for marking said failed data block with an indicator that attempts to access said failed data block should be redirected; and
means for performing said redirecting operation in response to said indicator.

11. Memory or mass storage including instructions, said instructions being capable of being performed by one or more computing devices, said instructions directing said one or more computing devices to
identify a first group of data blocks, said first group including a block capable of maintaining redundant information associated with said data blocks;

determine if there is a failed data block in said first group;
in response to a result of said instructions to determine, reconstruct data from said failed data block and send said data to a data block associated with a second group, said second group having at least one non-failed data block;
maintain information about a set of failed data blocks on a first disk, said information including a stripemap with entries indicating which groups of data blocks have been migrated to one or more second disks; and
logically set said failed data block to a selected value, whereby later calculation of said redundant information for said first group can proceed without reconstructing said data.

12. Memory or mass storage as in claim 11, including instructions to
in response to information about said failed data block, determining whether to refrain from sending data from said failed data block to said second group, and instead set a target data block in said second group to said selected value.

13. Memory or mass storage as in claim 11, including instructions to
logically remove said first disk from a storage system when substantially all said failed data blocks have been migrated to said one or more second disks.

14. Memory or mass storage as in claim 11, including instructions to
identify attempts to access said failed data block;
in response to said attempts to access, perform said instructions to reconstruct to a target data block; and
redirect said attempts to access to said target data block.

15. Memory or mass storage as in claim 14, including instructions to
mark said failed data block with an indicator that attempts to access said failed data block should be redirected; and
perform said instructions to redirect in response to said indicator.

16. A method of operating a storage system, said method including
setting selected data blocks to a selected value, wherein an amount of parity recalculation by said storage system is reduced, and said setting operation is performed when a consistency point is generated for the storage system, wherein the storage system is atomically self-consistent at the consistency point;
wherein said setting operation is responsive to a table associated with said selected data blocks, said table including an indication that data in said selected data blocks should be copied at a selected future time.

17. A method as in claim 16, wherein said setting operation is responsive to a new disk added to a RAID group.

18. A method as in claim 16, wherein said selected data blocks include a subset of data blocks maintained by said storage system, said subset including those data blocks not written to as part of an operation of writing said consistency point to disk.

19. A method as in claim 16, wherein said selected future time includes a time at which said consistency point in a file system is written to disk.

20. A method including
identifying a first group of data blocks, said first group including a block capable of maintaining parity information associated with said data blocks;
determining if said parity information is accessible;
if said determining operation indicates that said parity information is not accessible, sending accessible data of said first group to a set of data blocks associated with one or more second groups, said second groups each having accessible blocks capable of maintaining parity information.

21. A method as in claim 20, wherein said step of sending data includes sending data stripes from disks that have a corresponding parity to other strips on the same or other disks.

22. A method as in claim 20, wherein said first group includes a RAID stripe.

23. A method as in claim 20, wherein said determining operation includes determining if there is any failure of a disk including said block capable of maintaining said parity information.

24. A method as in claim 20, wherein said determining operation includes determining if there is any failure of said block capable of maintaining said parity information.

25. A method as in claim 20, including
receiving information regarding said data blocks associated with said first group;
in response to said receiving operation, performing said sending data operation only for a subset of said data blocks.

26. A method as in claim 25, wherein said information regarding said data blocks includes at least one of: which data blocks have allocated data, which data blocks have no allocated data, which data blocks have data no longer of use.

27. A method as in claim 25, wherein said information includes which data blocks are known to be zero.

28. A method as in claim 20, wherein said sending operation is responsive to an indication that said data should be sent at a future time.

29. A method as in claim 28, wherein said future time includes a time at which a file system generates a consistency point including said data from said first group.

30. Memory or mass storage including instructions, said instructions being capable of being performed by one or more computing devices, said instructions directing said one or more computing devices to
identify a first group of data blocks, said first group including a block capable of maintaining parity information associated with said data blocks;
determine if said parity information is accessible;
if performance of said instructions to determine indicates that said parity information is not accessible, send accessible data of said first group to a set of data blocks associated with one or more second groups, said second groups each having accessible blocks capable of maintaining parity information.

31. A memory or mass storage as in claim 30, wherein said instruction to send data includes sending data stripes from disks that have a corresponding parity to other stripes on the same or other disks.

32. Memory or mass storage as in claim 30, wherein said first group includes a RAID stripe.

33. Memory or mass storage as in claim 30, wherein said instructions to determine include instructions to determine if there is any failure of a disk including said block capable of maintaining said parity information.

34. Memory or mass storage as in claim 30, wherein said instructions to determine include instructions to determine if there is any failure of said block capable of maintaining said parity information.

35. Memory or mass storage as in claim 30, including instructions to receive information regarding said data blocks associated with said first group;

in response to said instructions to receive, perform said instructions to send only for a subset of said data blocks.

36. Memory or mass storage as in claim 35, wherein said information regarding said data blocks includes at least one of: which data blocks have allocated data, which data blocks have no allocated data, which data blocks have data no longer of use.

37. Memory or mass storage as in claim 35, wherein said information includes which data blocks are known to be zero.

38. Memory or mass storage as in claim 30, wherein said instructions to send are responsive to an indication that said data should be sent at a future time.

39. A method as in claim 38, wherein said future time includes a time at which a file system generates a consistency point including said data from said first group, wherein the file system is atomically self-consistent at the consistency point.

40. A method including selecting a set of data blocks to send from a source device to a target device;

copying said data blocks to said target device;

copying parity associated with said data blocks from said source device to said target device;

setting any unallocated blocks at said target device to a selected value, whereby said parity for said data blocks is accurate on said target device;

whereby a minor relationship between said source device and said target device is established.

41. A method as in claim 40, including sending information regarding an organization of said data blocks on a storage volume.

42. A method as in claim 40, wherein said data blocks are organized in a set of stripes, said stripes defining parity for selected groups of said data blocks; and said unallocated blocks include any blocks in said stripes not allocated for said data blocks.

43. A method as in claim 40, wherein said set of data blocks is substantially a minimum number of data blocks not already present at said target.

44. Memory or mass storage including instructions, said instructions being capable of being performed by one or more computing devices, said instructions directing said one or more computing devices to select a set of data blocks to send from a source device to a target device;

copy said data blocks to said target device;

copy parity associated with said data blocks from said source device to said target device;

set any unallocated blocks at said target device to a selected value, whereby said parity for said data blocks is accurate on said target device;

whereby a mirror relationship between said source device and said target device is established.

45. Memory or mass storage as in claim 44, including instructions to send information regarding an organization of said data blocks on a storage volume.

46. Memory or mass storage as in claim 44, wherein said data blocks are organized in a set of stripes, said stripes defining parity for selected groups of said data blocks; and said unallocated blocks include any blocks in said stripes not allocated for said data blocks.

47. Memory or mass storage as in claim 44, wherein said set of data blocks is substantially a minimum number of data blocks not already present at said target.

48. Apparatus including means for selecting a set of data blocks to send from a source device to a target device;

means for copying said data blocks to said target device;

means for copying parity associated with said data blocks from said source device to said target device;

means for setting any unallocated blocks at said target device to a selected value, whereby said parity for said data blocks is accurate on said target device;

whereby a minor relationship between said source device and said target device is established.

49. Apparatus as in claim 48, including means for sending information regarding an organization of said data blocks on a storage volume.

50. Apparatus as in claim 48, wherein said data blocks are organized in a set of stripes, said stripes defining parity for selected groups of said data blocks; and said unallocated blocks include any blocks in said stripes not allocated for said data blocks.

51. Apparatus as in claim 48, wherein said set of data blocks is substantially a minimum number of data blocks not already present at said target.

52. An apparatus coupled to a RAID group storing datablocks, the apparatus comprising:

a data storage device and a processor capable of accessing the data storage device;

wherein the processor maintains on the data storage device information regarding the datablocks, the information including a zeromap table, including a set of entries describing which datablocks have been set to zero;

a blockmap table, including a set of entries describing which datablocks are in use by allocated file system data; and a stripemap table, including a set of stripemap entries that correspond to one or more RAID stripes in a failed disk in a RAID group that have been migrated to a nonfailing disk in said RAID group.

53. An apparatus as in claim 52, wherein data is reconstructed from said failed disk by copying entries in said blockmap table that are associated with allocated data to a nonfailing disk in said RAID group.

54. An apparatus as in claim 52, wherein data is reconstructed from said failed disk by copying said set of entries in said blockmap table that are associated with allocated data to a nonfailing disk in a different RAID group.

55. An apparatus as in claim 52, wherein data is reconstructed at a next consistency point, wherein a file system stored on the RAID group is atomically self-consistent at the next consistency point.

56. An apparatus as in claim 52, wherein each entry in said set of entries in said stripemap table includes a set of information relating to a migration of a RAID stripe.

57. An apparatus as in claim 56, wherein said set of information includes a target location for said migration of data blocks associated with said RAID stripe.

58. An apparatus as in claim 52, wherein each entry in said set of entries in said stripemap table corresponds to information that can be deleted from said failed disk.

59. An apparatus as in claim 52, wherein a relative difference between the number of entries in said zeromap table and the number of nonzero data blocks determines whether parity is calculated by subtraction or by adding all of the data blocks.

60. An apparatus coupled to a RAID group storing datablocks, the apparatus comprising:
  a data storage device and a processor capable of accessing the data storage device;
  wherein the processor maintains on the data storage device information regarding the datablocks, the information including
    a zeromap table, including a set of entries describing which datablocks have been set to zero;
    a blockmap table, including a set of entries describing which datablocks are in use by allocated file system data;
    a stripemap table, including a set of stripemap entries that correspond to one or more RAID stripes in a failed disk in a RAID group that have been migrated to a nonfailing disk in said RAID group; and
  said set of entries in said stripemap table is updated after reconstructing said set of entries in said blockmap table.

* * * * *